(12) United States Patent
Eguchi et al.

(10) Patent No.: US 7,337,292 B2
(45) Date of Patent: Feb. 26, 2008

(54) METHOD AND APPARATUS FOR DATA RELOCATION BETWEEN STORAGE SUBSYSTEMS

(75) Inventors: Yoshiaki Eguchi, Machida (JP); Hiroshi Arakawa, Sagamihara (JP); Yasutomo Yamamoto, Sagamihara (JP); Takashige Iwamura, Yokohama (JP); Kouji Arai, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/649,767

(22) Filed: Jan. 5, 2007

(65) Prior Publication Data

US 2007/0113037 A1 May 17, 2007

Related U.S. Application Data

(63) Continuation of application No. 11/311,487, filed on Dec. 20, 2005, now Pat. No. 7,162,603, which is a continuation of application No. 11/052,072, filed on Feb. 8, 2005, now Pat. No. 7,007,147, which is a continuation of application No. 10/234,166, filed on Sep. 5, 2002, now Pat. No. 6,895,483.

(30) Foreign Application Priority Data

May 27, 2002 (JP) .............................. 2002-151836

(51) Int. Cl.
*G06F 12/00* (2006.01)
(52) U.S. Cl. ........................... 711/165; 711/4; 711/111; 711/112; 711/114; 711/203
(58) Field of Classification Search ................ 711/165, 711/4, 111, 112, 114, 203
See application file for complete search history.

(56) References Cited

U.S. PATENT DOCUMENTS 5,584,018 A    12/1996    Kamiyama ................... 711/165

(Continued)

FOREIGN PATENT DOCUMENTS

JP    8-221372    8/1996

(Continued)

OTHER PUBLICATIONS

Milligan et al., "Online Storage Virtualization: The Key To Managing The Data Explosion," pp. 3052-3060, IEEE, Jan. 10, 2002.*

(Continued)

*Primary Examiner*—Stephen C. Elmore
(74) *Attorney, Agent, or Firm*—Mattingly, Stanger, Malur & Brundidge, PC

(57) ABSTRACT

A storage subsystem that has detected the necessity of the data relocation determines whether the data relocation is possible or not from one storage unit to another within the particular storage subsystem. A virtualization device is notified in the case where the data relocation in the particular subsystem is impossible. The manager of the virtualization device gives an inquiry to the storage subsystems as to whether any one of them can become a relocation destination or not. A storage subsystem determines, based on the related information, whether the data relocation requested is possible or not within the particular storage subsystem. In the case where such a relocation is possible, the copying process is carried out for data relocation from one storage subsystem to another in compliance with an instruction from the virtualization device.

11 Claims, 20 Drawing Sheets

U.S. PATENT DOCUMENTS

| | | | |
|---|---|---|---|
| 5,584,042 A | 12/1996 | Cormier et al. | 710/36 |
| 5,956,750 A | 9/1999 | Yamamoto et al. | 711/167 |
| 5,996,054 A | 11/1999 | Ledain et al. | 711/203 |
| 6,405,284 B1 | 6/2002 | Bridge | 711/114 |
| 6,446,161 B1 | 9/2002 | Yamamoto et al. | 711/114 |
| 6,636,951 B1 | 10/2003 | Tachikawa | 711/154 |
| 6,708,252 B2 | 3/2004 | Yamamoto et al. | 711/114 |
| 6,728,831 B1 | 4/2004 | Bridge | 711/112 |
| 6,763,442 B2 | 7/2004 | Arakawa et al. | 711/165 |
| 6,766,430 B2 | 7/2004 | Arakawa et al. | 711/165 |
| 6,895,467 B2 * | 5/2005 | Lubbers et al. | 711/114 |
| 6,925,528 B2 * | 8/2005 | Selkirk et al. | 711/114 |
| 6,959,360 B2 | 10/2005 | Murotani et al. | 711/114 |
| 7,260,696 B2 | 8/2007 | Arakawa et al. | 711/165 |
| 2002/0004857 A1 | 1/2002 | Arakawa et al. | 710/1 |
| 2002/0087780 A1* | 7/2002 | Selkirk et al. | 711/6 |
| 2002/0099908 A1 | 7/2002 | Yamamoto et al. | 711/114 |
| 2002/0141296 A1 | 10/2002 | Tezuka et al. | 369/30.2 |
| 2002/0184463 A1 | 12/2002 | Arakawa et al. | 711/170 |
| 2003/0084241 A1* | 5/2003 | Lubbers et al. | 711/114 |
| 2003/0093439 A1 | 5/2003 | Mogi et al. | 707/200 |

FOREIGN PATENT DOCUMENTS

| | | |
|---|---|---|
| JP | 10-154123 | 6/1998 |
| JP | 2000-293317 | 10/2000 |
| JP | 2001-067187 | 3/2001 |
| JP | 2001-337790 | 12/2001 |
| JP | 2002-082775 | 3/2002 |

OTHER PUBLICATIONS

D.A. Patterson et al, "A Case for Redundant Arrays of Inexpensive Disks", Proceedings of ACM SIGMOD, Jun. 1988, pp. 109-116.

M.T. O'Keefe, "Shared File System and Fiber Channel", Proc. Sixth Goddard Conference on Mass Storage Systems and Technologies, Mar. 1998, pp. 1-16.

M. Farley, "Building Storage Networks, Second Edition," Osborne Publishing, Chapter 10, pp. 302-321, May 22, 2001.

"The Evaluator Series Virtualization of Disk Storage", WP-0007-1, Sep. 2000, by Evaluator Group, Inc., www.evaluatorgroup.com, pp. ii-12.

* cited by examiner

FIG. 3

173 LU/LOGICAL/PHYSICAL-BASED INFORMATION

| LOGICAL ADDRESS | | | | | PHYSICAL ADDRESS | | | | |
|---|---|---|---|---|---|---|---|---|---|
| | | | | | | DATA | | PARITY | |
| LU NO. | IN-LU ADDRESS | LOGICAL VOLUME NO. | LOGICAL VOLUME ADDRESS | P.G. NO. | DISK DRIVE NO. | IN-DISK DRIVE ADDRESS | DISK DRIVE NO. | IN-DISK DRIVE NO. | |
| 0 | 0~1023 | 0000 | 0~1023 | 0101 | 0 | 0~1023 | 4 | 0~1023 | |
| 0 | 1024~2047 | 0000 | 1024~2047 | 0101 | 1 | 0~1023 | 4 | 0~1023 | |
| 0 | 2048~3071 | 0001 | 0~1023 | 0101 | 2 | 0~1023 | 4 | 0~1023 | |
| 0 | 3072~4095 | 0001 | 1024~2047 | 0101 | 3 | 1024~2047 | 4 | 0~1023 | |
| 0 | 4096~5119 | 0002 | 0~1023 | 0101 | 0 | 0~1023 | 4 | 1024~2047 | |
| 1 | 0~1023 | 0101 | 0~1023 | 0102 | 5 | 0~1023 | 7 | 0~1023 | |
| 1 | 1024~2047 | 0102 | 0~1023 | 0102 | 6 | 0~1023 | 8 | 0~1023 | |
| 2 | 0~1023 | 0103 | 0~1023 | 0102 | 5 | 1024~2047 | 7 | 1024~2047 | |
| ⋮ | ⋮ | ⋮ | ⋮ | ⋮ | ⋮ | ⋮ | ⋮ | ⋮ | |

FIG. 4

176 LOGICAL AREA USE INFORMATION

| I/O TYPE / LOGICAL VOLUME NO. | SEQUENTIAL READ | SEQUENTIAL WRITE DATA | SEQUENTIAL WRITE PARITY | RANDOM READ | RANDOM WRITE DATA | RANDOM WRITE PARITY | ... | TOTAL |
|---|---|---|---|---|---|---|---|---|
| 0000 | OCCUPIED TIME | OCCUPIED TIME | OCCUPIED TIME | OCCUPIED TIME | OCCUPIED TIME | OCCUPIED TIME | ... | OCCUPIED TIME |
| 0001 | OCCUPIED TIME | OCCUPIED TIME | OCCUPIED TIME | OCCUPIED TIME | OCCUPIED TIME | OCCUPIED TIME | ... | OCCUPIED TIME |
| 0002 | OCCUPIED TIME | OCCUPIED TIME | OCCUPIED TIME | OCCUPIED TIME | OCCUPIED TIME | OCCUPIED TIME | ... | OCCUPIED TIME |
| 0003 | OCCUPIED TIME | OCCUPIED TIME | OCCUPIED TIME | OCCUPIED TIME | OCCUPIED TIME | OCCUPIED TIME | ... | OCCUPIED TIME |
| ... | ... | ... | ... | ... | ... | ... | ... | ... |

FIG. 5

178 LOGICAL STORAGE UNIT MANAGEMENT INFORMATION

| LOGICAL VOLUME NO. | ASSOCIATED P.G. | SIZE | PATH DEFINITION | STATUS | VOLUME PERFOR- MANCE |
|---|---|---|---|---|---|
| 0000 | 0101 | 3000 | 1 | ON LINE | 0 |
| 0001 | 0201 | 3000 | 1 | ON LINE | 1 |
| ... | ... | ... | ... | ... | ... |
| 1101 | 0201 | 3000 | 1 | OFF LINE | 1 |
| ... | ... | ... | ... | ... | ... |

FIG. 6

177 PHYSICAL AREA USE INFORMATION

| I/O TYPE / P.G. NO. | SEQUENTIAL READ | SEQUENTIAL WRITE DATA | SEQUENTIAL WRITE PARITY | RANDOM READ | RANDOM WRITE DATA | RANDOM WRITE PARITY | ... | TOTAL |
|---|---|---|---|---|---|---|---|---|
| 0101 | OCCUPIED TIME | OCCUPIED TIME | OCCUPIED TIME | OCCUPIED TIME | OCCUPIED TIME | OCCUPIED TIME | ... | OCCUPIED TIME |
| 0102 | OCCUPIED TIME | OCCUPIED TIME | OCCUPIED TIME | OCCUPIED TIME | OCCUPIED TIME | OCCUPIED TIME | ... | OCCUPIED TIME |
| ... | ... | ... | ... | ... | ... | ... | ... | ... |

FIG. 7

179 PHYSICAL STORAGE UNIT MANAGEMENT INFORMATION

| P.G. NO. | VOLUME PERFOR-MANCE | RAID LEVEL | CONFIGU-RATION | SEQUENTIAL VOLUME | HDD ID |
|---|---|---|---|---|---|
| 0101 | 0 | RAID 5 | 4D1P | No | 2 |
| 0102 | 1 | RAID 1 | 2D2D | Yes | 3 |
| ... | ... | ... | ... | ... | ... |

FIG. 8

180 STORAGE UNIT PERFORMANCE INFORMATION

| HDD ID | ROTATIONAL SPEED (RPM) | SEEK TIME (AVERAGE READ/AVERAGE WRITE (MSEC.)) | LATENCY (AVERAGE ROTATION WAIT TIME (MSEC.)) | MEDIA TRANSFER RATE(INNER PERIPHERY/OUTER PERIPHERY (M BITS/S)) | SUSTAINING TRANSFER RATE (INNER PERIPHERY /OUTER PERIPHERY) (M BYTES/S)) | INTERFACE TRANSFER RATE | COMMAND OVERHEAD (MS) |
|---|---|---|---|---|---|---|---|
| 0 | 10K | 5.1/5.5 | 2.99 | 671/399 | 63.9/38.4 | 2Gbits/s | 0.1 |
| 1 | 7.2K | 7.4/8.2 | 4.17 | 508/282 | 47/26 | 2Gbits/s | 0.1 |
| ... | ... | ... | ... | ... | ... | ... | ... |
| K | 14.9K | 3.8/4.4 | 2.01 | 706/548 | 60.5/43.5 | 2Gbits/s | 0.1 |

FIG. 9

126-1 VOLUME MANAGEMENT INFORMATION

| HOST-SIDE ADDRESS | | STORAGE-SIDE ADDRESS | | | | | |
|---|---|---|---|---|---|---|---|
| VOLUME NO. | VOLUME ADDRESS | STORAGE UNIT NO. | PORT ADDRESS | LU NO. | IN-LU ADDRESS | STATUS | EMULATION TYPE |
| 0000 | 0~1023 | 0 | 11:22:33:44:55:66:77:80 | 0 | 0~1023 | ON LINE | OPEN3 |
| 0000 | 1024~2047 | 1 | 10:20:30:40:50:60:70:80 | 0 | 0~1023 | OFF LINE | OPEN9 |
| 0001 | 2048~3071 | 0 | 11:22:33:44:55:66:77:81 | 1 | 0~1023 | ON LINE | OPEN9 |
| 0001 | 3072~4095 | 1 | 10:20:30:40:50:60:70:81 | 1 | 0~1023 | ON LINE | OPEN9 |
| 0002 | 4096~5119 | 2 | 11:22:33:44:55:50:77:70 | 0 | 0~1023 | ON LINE | OPEN6 |
| 0002 | 5120~6143 | 2 | 11:22:33:44:55:50:77:70 | 1 | 0~1023 | ON LINE | OPEN6 |
| 0003 | 6144~7167 | 2 | 11:22:33:44:55:50:77:70 | 2 | 0~1023 | ON LINE | 3390-3 |
| 0003 | 7168~8191 | 1 | 10:20:30:40:50:60:70:82 | 2 | 0~1023 | ON LINE | 3390-3 |
| ... | ... | ... | ... | ... | ... | ... | ... |

FIG. 10

126-2 VOLUME MANAGEMENT INFORMATION

| STORAGE UNIT NO. | STORAGE-SIDE ADDRESS | | | STATUS |
|---|---|---|---|---|
| | PORT ADDRESS | LU NO. | IN-LU ADDRESS | |
| 0 | 11:22:33:44:55:66:77:80 | 0 | 1024~5119 | OFF LINE |
| 1 | 10:20:30:40:50:60:70:80 | 0 | 1024~5119 | OFF LINE |
| 0 | 11:22:33:44:55:66:77:81 | 1 | 1024~5119 | OFF LINE |
| 1 | 10:20:30:40:50:60:70:81 | 1 | 1024~5119 | RESERVE |
| 2 | 11:22:33:44:55:50:77:70 | 0 | 1024~5119 | OFF LINE |
| 2 | 11:22:33:44:55:50:77:70 | 1 | 1024~5119 | OFF LINE |
| 2 | 11:22:33:44:55:50:77:70 | 2 | 1024~5119 | OFF LINE |
| 1 | 10:20:30:40:50:60:70:82 | 2 | 1024~5119 | RESERVE |
| ... | ... | ... | ... | ... |

FIG. 11

188-1 RELOCATION INFORMATION

| RELOCATION SOURCE ADDRESS (LOGICAL VOLUME NO.) 904 | RELOCATION DESTINATION 905 ||| STANDBY FOR PROCESSING:0, IN PROCESS:1, NORMAL END:-1, ABNORMAL END:-1, STANDBY FOR END PROCESS:4 910 | SIZE AFTER COMPLETION OF COPYING PROCESS 911 | EXECUTION TIME 912 |
|---|---|---|---|---|---|---|
| | INSIDE SUBSYSTEM:0 OUTSIDE SUBSYSTEM:1 906 | RELOCATION DESTINATION ADDRESS (PORT ADDRESS) 907 | RELOCATION DESTINATION ADDRESS (LOGICAL VOLUME NO.) 908 | | | |
| 0101 | 0 | -1 | 1011 | 2 | 4294967295 | YYMMDD HHMMSS |
| 0002 | 0 | -1 | 0809 | 2 | 8589934591 | YYMMDD HHMMSS |
| ... | ... | ... | ... | ... | ... | |
| 0102 | 1 | 11:22:33:44: 55:66:77:80 | 0309 | 1 | 2147483647 | YYMMDD HHMMSS |
| 0003 | 1 | 11:22:33:44: 55:50:77:70 | 1223 | 0 | 0 | YYMMDD HHMMSS |

FIG. 13

188-3 RELOCATION INFORMATION

| RELOCATION SOURCE 901 | | RELOCATION DESTINATION 905 | | MODE 909 | | EXECUTION TIME 912 |
|---|---|---|---|---|---|---|
| PORT ADDRESS 903 | LOGICAL VOLUME NO. 904 | PORT ADDRESS 907 | LOGICAL VOLUME NO. 908 | PROCESSING MODE 910 | SIZE AFTER COPYING 911 | |

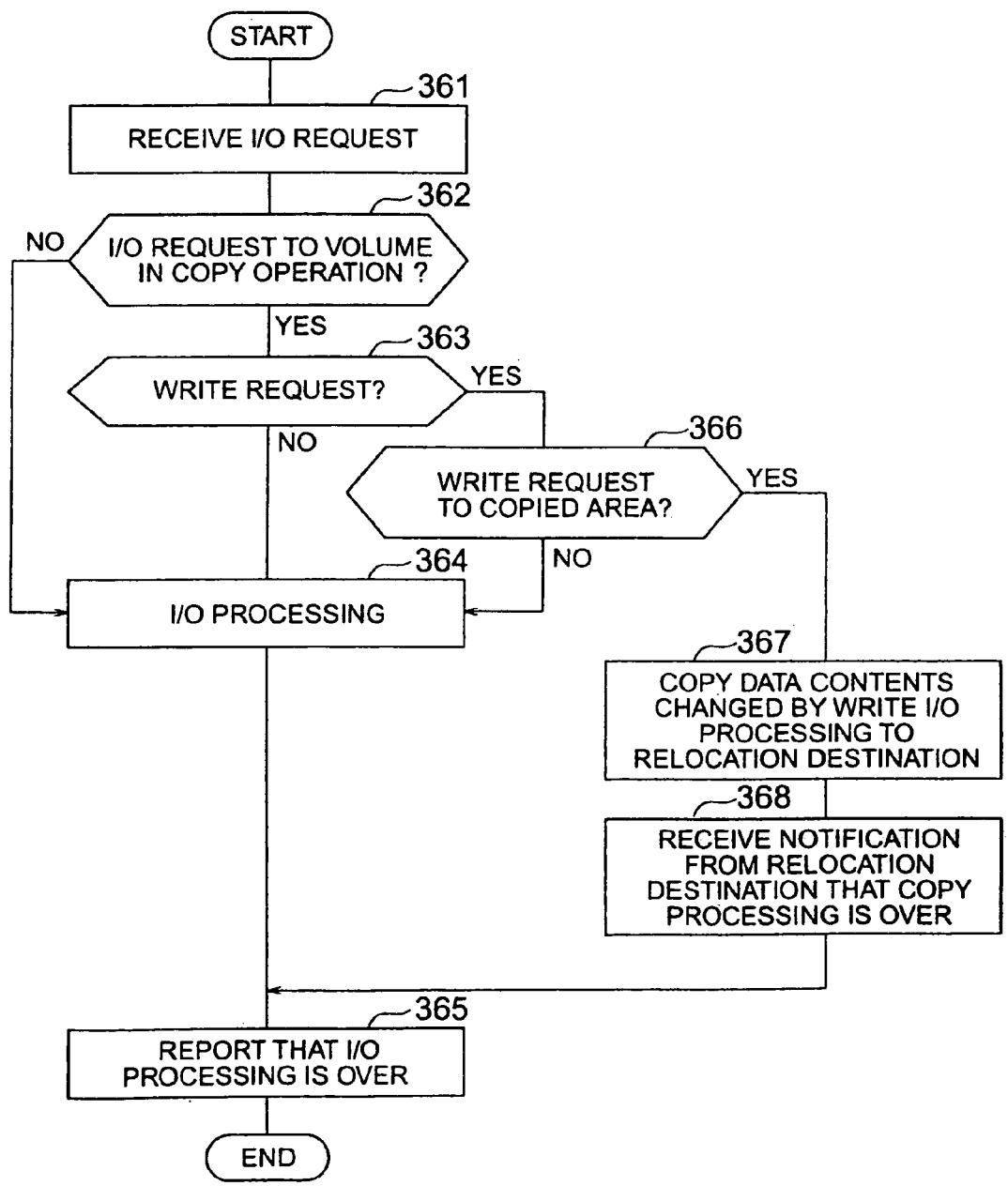

METHOD AND APPARATUS FOR DATA RELOCATION BETWEEN STORAGE SUBSYSTEMS

This is a continuation of Ser. No. 11/311,487, filed Dec. 20, 2005, now U.S. Pat. No. 7,162,603, which is a continuation of Ser. No. 11/052,072, filed Feb. 8, 2005, now U.S. Pat. No. 7,007,147, which is a continuation of Ser. No. 10/234,166, filed on Sep. 5, 2002, now U.S. Pat. No. 6,895,483.

BACKGROUND OF THE INVENTION

In a computer system, one of the secondary storage systems for realizing a high performance is a disk array system. The disk array system has a plurality of physical storage units arranged in an array, and the read/write operation of data stored distributively in the physical storage units are performed in parallel to achieve a high-performance storage.

An article on the disk array system is D. A. Patterson, G. Gibson, and R. H. Kats, "A Case for Redundant Arrays of Inexpensive Disks" (in Proc. ACM SIGMOD, pp. 109-116, June 1988). This article deals with a disk array system having a redundancy divided into five types of levels 1 to 5 according to the configuration thereof. In addition to these types, a disk array system having no redundancy is sometimes called level 0. Each level has a different cost or a different performance characteristic according to the degree of redundancy. In constructing a disk array system, therefore, a plurality of levels of arrays (sets of physical storage units) are often mixed. The set of physical units will be called a parity group herein.

On the other hand, each single physical storage unit has a different cost according to the performance or capacity. In constructing a disk array system, therefore, a plurality of types of physical storage units having different performances or capacity may be used to realize an optimum cost performance.

The data stored in a disk array system are arranged distributively in a plurality of physical storage units. The disk array system, therefore, holds the information on the correspondence between the address of a storage area of the physical storage units and the address of a logical storage area accessed by a host computer connected to the disk array system.

According to the technique disclosed in JP-A-2000-293317, the data relocation between physical storage areas is executed in a disk array system, and the physical storage areas corresponding to the logical storage areas of data before relocation are changed to those after relocation. Also, the disk array system manages the load situation due to the access from the host computer to each logical storage area, and according to the actual situation thereof, the specific relocation is determined in such a manner as to secure proper data arrangement after relocation.

Generally, the processing in a computer system is executed in accordance with the schedule of the user. The I/O requests received by the storage subsystems, therefore, often undergo periodical variation and increase during a specified period of the day, month or year. The user is thus considered to be generally interested in the storage performance during a specified period in which the storage utilization increases.

JP-A-2001-67187 discloses a technique in which the storage units in the storage are managed by being classified according to the performance thereof, the information on the actual use of the storage units are accumulated by the storage, the utilization rate of a logical storage area is predicted based on this actual use information during a set period, and the logical storage area is optimally arranged at a set time in accordance with a program.

A technique for data transfer between a host computer and storage subsystems such as a disk array system is disclosed by M.T.O' Keefe in "Shared File System and Fibre Channel" (in Proc. Sixth Goddard Conference on Mass Storage Systems and Technologies, pp. 1-16, March 1998). In this technique, a plurality of host computers and a plurality of storage subsystems are connected to each other by a Fibre Channel (hereinafter referred to as "FC") constituting a high-speed network thereby to realize what is called a storage area network (SAN), that is, a storage environment for realizing the data sharing through the FC. By carrying out the data transfer through the FC in this way, the load on the host computers and the network is reduced as compared with an ordinary network.

NFS (Network File System) is widely known as a technique in which data such as files held in the storage subsystems connected to an ordinary network using no high-speed FC are shared by a plurality of computers. In the case where data are shared by networks using NFS, as compared with when FC is used, a load is increased on the computers sharing the files and the network connecting the computers and the storage subsystems. Since the NFS makes it possible to use the existing network, however, has the advantage, as compared with employing a new FC network, that the new equipment cost is reduced and the file sharing can be managed more easily.

Further, a technique for virtualizing and pooling the storage device is disclosed in "Building Storage Network" (by MARC FARLEY, Osborne Publishing, ISBN: 0-07-213072-5), Chapter 10 (pp. 302-340), and "The Evaluator Series Virtualization of Disk Storage" (WP-0007-1, Sep. 2000), by Evaluator Group Inc. (www.evaluatorgroup.com).

This technique concerns the virtualization in which the whole storage provided by a plurality of storage subsystems are collected in a manner visible from the host computer as a single virtual storage pool. The virtualization device supplies the host computer with a storage area of the storage pool required for the host computer as a virtual storage. For this purpose, the virtualization device has the address conversion function for changing the address of the virtual storage recognized by the host computer to the address of the storage recognized by the storage subsystems.

SUMMARY OF THE INVENTION

The technique disclosed in JP-A-2000-293317 makes it possible to relocate the logical volume within a storage subsystem. In a computer system having a plurality of storage subsystems, however, data cannot be relocated between different storage subsystems.

Data relocation requires the performance information, the utilization rate history and the configuration information of the volume in the storage subsystems. The amount of these information is so vast that it is difficult for a host computer external to the storage subsystems, for example, to collect these information from the storage subsystems and form a proper data relocation plan.

In similar fashion, the information on the configuration of a plurality of storage subsystems can be managed by the virtualization device by use of the storage virtualization technique described in "Building Storage Networks" (by MARC FARLEY, Osborne Publishing, ISBN: 0-07-213072-

5), Chapter 10 (pp. 302-340), and "The Evaluator Series Virtualization of Disk Storage" (WP-0007-1, September 2000), by Evaluator Group Inc. (www.evaluatorgroup.com), thereby eliminating the need of each host computer managing the storage subsystems on the SAN. Nevertheless, it is still difficult for the virtualization device to collect and manage the performance information and the utilization rate history of each storage subsystem and form a proper relocation plan.

Accordingly, it is an object of the present invention to provide a method and an apparatus for data relocation which obviates the problems of the conventional techniques described above.

Another object of the invention is to provide a method and an apparatus in which data are relocated between different storage subsystems in a manner transparent to the host computer.

In order to achieve the objects described above, according to one aspect of the invention, there is provided a data relocation method for a computer system including a host computer, a plurality of storage subsystems each having a plurality of storage units, and a data relocation management unit for managing the data relocation between the storage subsystems, comprising the steps of:

determining whether the data relocation from one storage unit to another within one of the storage subsystems which constitutes a relocation source, based on the performance information and the utilization information of the particular one of the storage subsystems;

determining whether the data relocation is possible or not to a storage unit within another one of the storage subsystems through the data relocation management unit in the case where the data relocation is impossible within the storage subsystem constituting the relocation source; and copying the data to the particular one storage subsystem constituting a relocation destination from the storage subsystem constituting the relocation source through the data relocation management unit in the case where the data relocation to the particular another storage subsystem is possible.

According to this invention, a vast amount of information including the performance information and the utilization rate history collected and stored in each storage subsystem are not required to be collected or managed in other than the storage subsystems (such as a host computer or a virtualization device), and the data can be relocated in and between the storage subsystems. Specifically, only in the case where the data are relocated between the storage subsystems, the information required for the relocation are transmitted from the storage subsystem constituting the relocation source to the storage subsystem constituting the relocation destination through the virtualization device or the data relocation management unit. As a result, the data relocation between different storage subsystems can be carried out in a manner transparent to the host computer.

Other objects, features and advantages of the invention will become apparent from the following description of the embodiments of the invention taken in conjunction with the accompanying drawings.

BRIEF DESCRIPTION OF THE DRAWINGS

FIG. 3 is a diagram showing a data structure of the LU, logical and physical information according to an embodiment of the invention.

FIG. 4 is a diagram showing a data structure of the logical area use information according to an embodiment of the invention.

FIG. 5 is a diagram showing a data structure of the logical storage unit management information according to an embodiment of the invention.

FIG. 6 is a diagram showing a data structure of the physical area use information according to an embodiment of the invention.

FIG. 7 is a diagram showing a data structure of the physical storage unit management information according to an embodiment of the invention.

FIG. 8 is a diagram showing a data structure of the storage unit performance information according to an embodiment of the invention.

FIG. 9 is a diagram showing a data structure of the volume management information according to an embodiment of the invention.

FIG. 10 is a diagram showing a data structure of the volume management information according to an embodiment of the invention.

FIG. 11 is a diagram showing a data structure of the relocation information according to an embodiment of the invention.

FIG. 13 is a diagram showing a data structure of the relocation information according to an embodiment of the invention.

FIG. 20 is a flowchart showing the steps of the process for the storage control unit of a copy source according to an embodiment.

DESCRIPTION OF THE EMBODIMENTS

Figure 1:
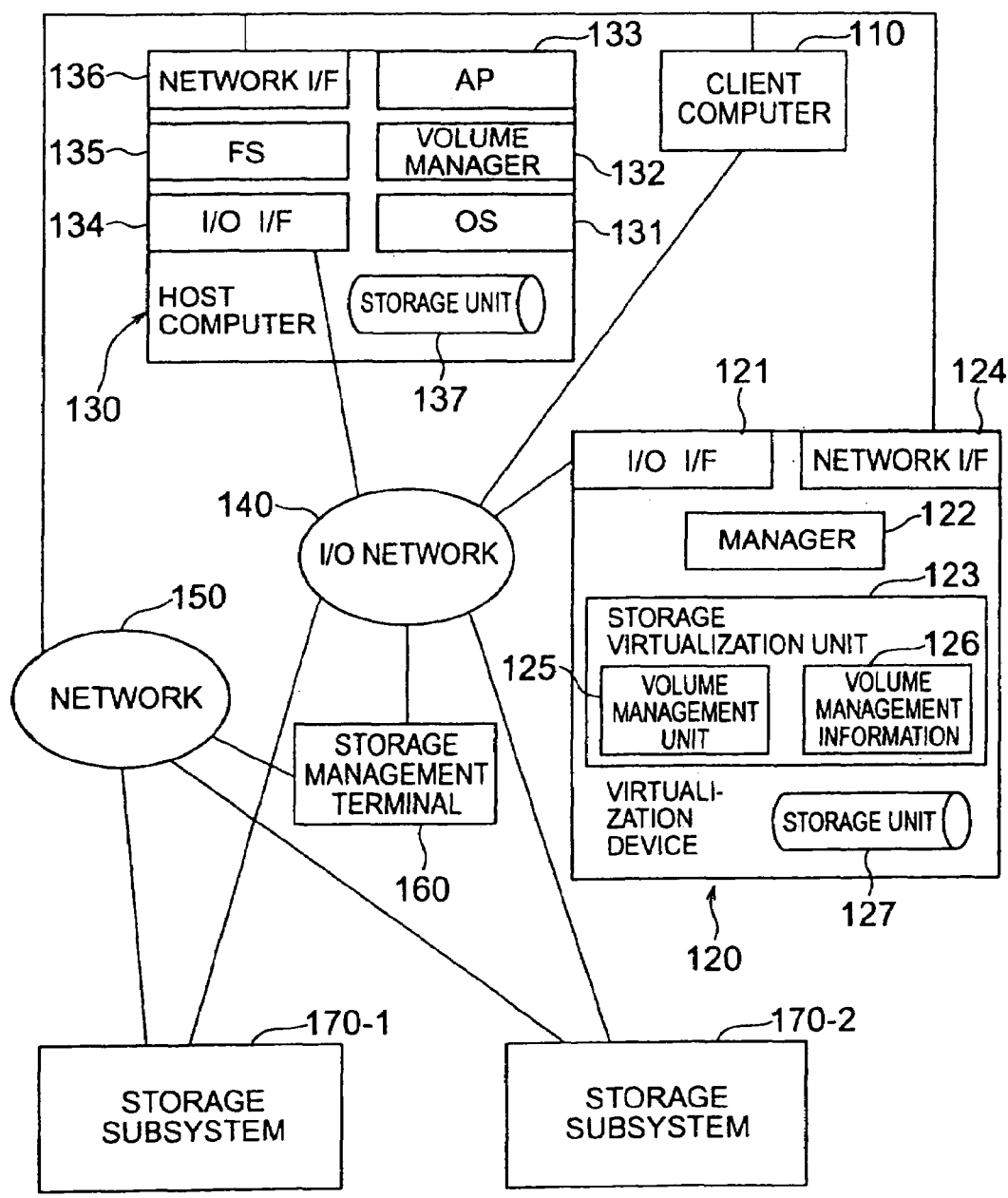
FIG. 1 is a diagram showing a configuration of a computer system according to an embodiment of the invention.

An embodiment of the invention will be explained below with reference to the accompanying drawings. In the description below, the component parts having the same functions will be designated by the same reference numerals, respectively, and will not be explained again.

FIG. 1 is a diagram showing a configuration of a computer system according to this embodiment. This system is configured of a host computer 130, a client computer 110, a plurality of storage subsystems 170, a virtualization device 120, a storage management terminal 160, an I/O network 140 for interconnecting the units and a network 150 for interconnecting the units.

The host computer 130 has mounted thereon an operating system (OS) 131, a filing system (FS) 135, a volume manager 132 and an application program (AP) 133, and is executed by a processor unit thereof. The volume manager 132 is a program for managing the volume handled by the host computer 130. The host computer 130 includes a storage unit 137 such as a local disk. Also, the host computer 130 includes an I/O interface (I/F) 134 for connecting to the I/O network 140 and a network interface (I/F) 136 for connecting to the network 150. The client computer 110, which has a similar configuration to the host computer 130, is defined as a computer for accessing the host computer 130 making up a server in this embodiment.

The storage subsystems 170 each have a physical storage unit such as a disk drive, and sends data to a host system as requested thereby or writes the requested data in the physical storage unit in response to an I/O request such as a read/write request issued from the host system. Specifically, the storage subsystems 170 provide storage for the host computer 130. Further, the storage subsystems 170 each hold the performance information and the utilization history information of a storage unit, so that the logical volume on the storage unit having a high utilization rate is relocated to another storage unit within the same storage subsystem 170 or a storage unit of another storage subsystem 170.

The virtualization device 120 manages the whole storage provided by a plurality of the storage subsystems 170 as a storage pool, and presents the appearance of a virtualized storage of the storage pool to the host computer 130. The volume management information 126 is an address conversion table for storing the information for mapping between the address of the storage visible from the host computer 130 and the address in the storage subsystems 170. Also, the virtualization device 120 intervenes between two storage subsystems 170 and supports the processing of relocation of the logical volume from one of the two storage subsystems 170 to another. The virtualization device 120 has mounted thereon a storage virtualization unit 123, a manager 122 and a CPU (not shown) and executes the processing through the CPU (central processing unit). The volume management unit 125 in the storage virtualization unit 123 conducts the maintenance of the vacant area and the address set in the volume management information 126. The storage virtualization unit 123 supplies the storage virtualization function to the host computer 130 by accessing the volume management information 126. The manager 122 is a program (software) which functions as a data relocation management unit and supports the relocation processing between the storage subsystems 170. The virtualization device 120 has a storage unit 127 such as a local disk or a semiconductor memory. The virtualization device 120 also has an I/O I/F 120 for connecting to the I/O network 140 and a network I/F 124 for connecting to the network 150. The virtualization device 120, which is a computer having a CPU and a memory, stores the manager 122 and the processing unit portion of the storage virtualization unit 123 in the memory and executes them through the CPU. Normally, the manager 122 and the storage virtualization unit 123 are executed as a program and may alternatively be executed by other means.

The storage management terminal 160, which is used for maintenance and management of the storage subsystems 170, will not be described in detail as it is directly related to the invention.

The I/O network 140 is a transmission path for transferring an I/O command, read/write data, etc. between the storage subsystems 170 and the host system, and can be implemented by LAN, FDDI, Fibre Channel, SCSI, iSCSI, Infiniband or the like. The network 150 is a transmission path for transferring control commands mainly other than the I/O command for the storage subsystems 170.

The host computer 130 utilizes the virtualization function of the virtualization device 120 by either of two methods. In one method, the host cost computer 130 utilizes the address conversion function of the virtualization device 120. Specifically, the host computer 130, sending an address of the logical storage unit recognized on host side to the virtualization device 120, acquires the address of the logical storage unit recognizable in the storage subsystems 170 side, and using the latter address, issues an I/O request directly to the storage subsystems 170. In the other method, the host computer 130 issues an I/O request to the virtualization device 120 using the former address. In this case, the storage virtualization unit 123 of the virtualization device 120 converts the former address to the latter address, and issues an I/O request to the storage subsystems 170 on behalf of the host computer 130. Thus, the virtualization device 120 receives an I/O end report from the storage subsystems 170, and relays it to the host computer 130 that has issued the I/O request. The second method will be mainly used in the case described below.

Figure 2:
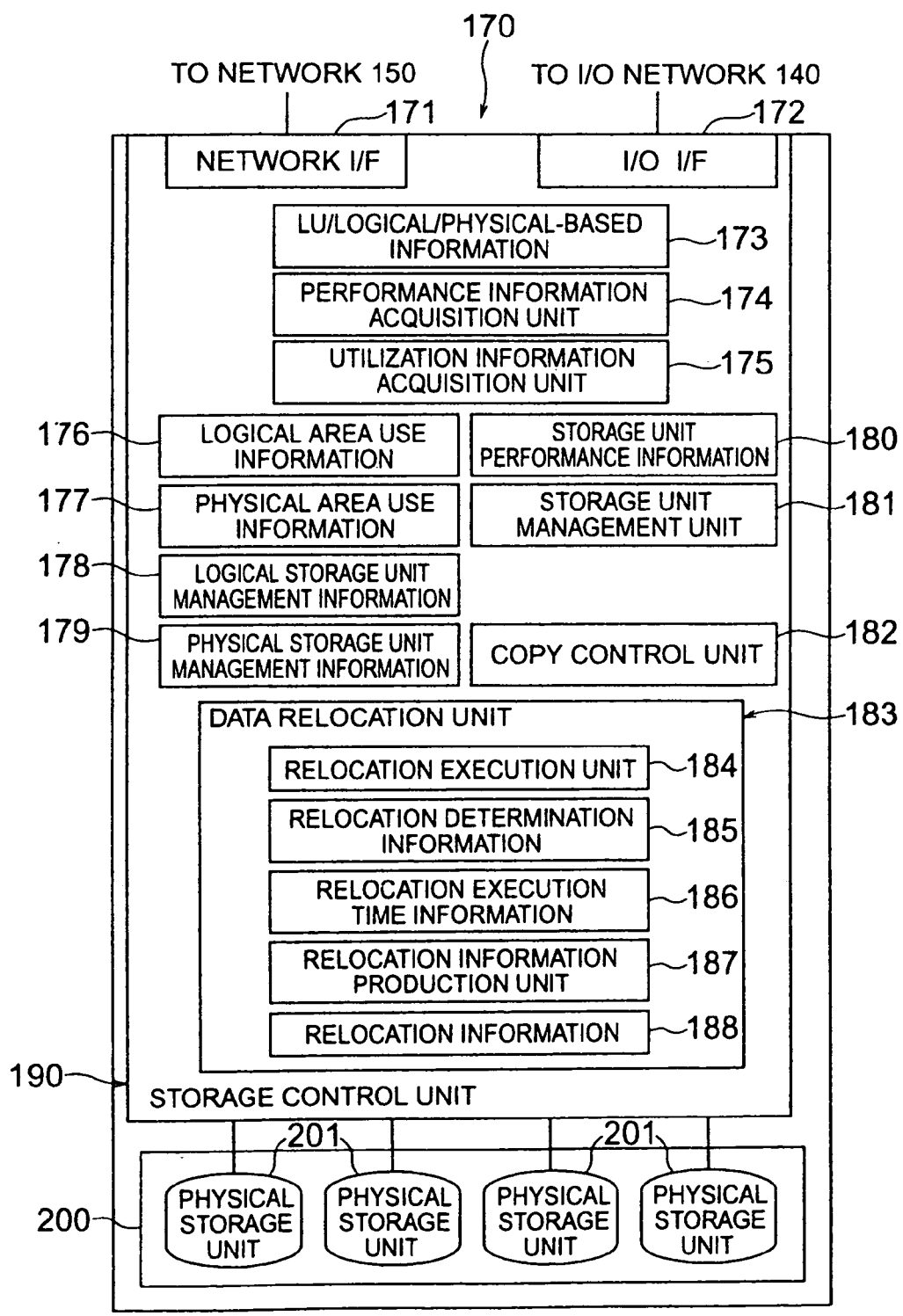
FIG. 2 is a diagram showing an internal configuration of a storage subsystem according to an embodiment of the invention.

FIG. 2 is a diagram showing an internal configuration of the storage subsystem 170. The storage subsystem 170 is roughly configured of a storage control unit 190 and physical storage units 201, which are connected to each other through a local interface. A plurality of physical storage units 201 make up a parity group 200.

The internal storage unit of the storage control unit 190 stores therein LU/logical/physical-related information 173, logical area use information 176, physical area use information 177, logical storage unit management information 178, physical storage unit management information 179 and storage unit performance information 180. The LU/logical/physical-related information 173 stores the address of the logical unit (LU) recognizable by the host system, the address about the logical volume recognizable by the storage subsystem 170 and the mapping information between and the addresses of the physical storage units.

The storage control unit 190 is configured of the processing units including the storage unit management unit 181, the copy control unit 182, the performance information acquisition unit 174 and the utilization information acquisition unit 175. The storage unit management unit 181 manages the storage units based on the LU/logical/physical-related information 173. The copy control unit 182 controls the data copy executed within a given storage subsystem 170 or between the storage subsystems 170. The performance information acquisition unit 174 stores, in the storage unit performance information 180, the performance information of the storage units input from an external source. The utilization information acquisition unit 175 collects the information on the use of the physical storage units and the logical storage units and stores them in the physical area use information 177 and the logical area use information 176, respectively. The storage control unit 190 includes a network I/F 171 for connecting to the network 150 and an I/O I/F 172 for connecting to the I/O network 140.

The storage control unit 190 further includes a data relocation unit 183. The data relocation unit 183 has a storage area for storing the relocation determination information 185, the relocation execution time information 186 and the relocation information 188. The data relocation unit 183 also includes the processing units such as the relocation execution unit 184 and the relocation information production unit 187. The relocation information production unit 187 determines whether the relocation of the logical volume is necessary, based on the relocation determination information 185, the physical area use information 177 and the logical area use information 176. In the case where the relocation is necessary, a relocation plan is formed within a particular storage subsystem or with the aid of the virtualization device 120 and stores it in the relocation information 188. With the arrival of the relocation execution time, the relocation execution unit 184 executes the relocation processing within the particular storage subsystem 170 or with other storage subsystems 170 with the aid of the virtualization device 120.

FIG. 3 is a diagram showing a data structure of the LU/logical/physical-related information 173. The LU/logical/physical-related information 173 is a table for storing the information on the correspondence between the logical address and the physical address. The logical address includes a LU (logical unit) number, an in-LU address, a logical volume number and an in-logical volume address. The LU number and the in-LU address are addresses recognized by the virtualization device 120 or the host computer 130. The in-LU address is identified, for example, by the block number. The logical volume number and the in-logical volume address are logical addresses recognized by the storage subsystems 170. The physical address includes a P.G. (parity group) number, a disk unit number and an in-disk unit address for the data section, and a disk unit number and an in-disk unit address for the parity section. The in-disk device address is identified by a physical block number, for example. The storage control unit 190, upon receipt of a read/write request with the designation of the LU number and the in-LU address from an external source, accesses the LU/logical/physical-related information 173 and converts the designated logical address into a physical address, followed by accessing the physical storage units 201.

FIG. 4 is a diagram showing a data structure of the logical area use information 176. The logical area use information 176 is a table for totalizing the occupied time of each logical volume for each I/O type. The occupied time indicates the read/write time length consumed for the physical storage units 201. The "sequential" or "random" is determined by the type of a command, the designated data size or the continuity of the addresses designated by a plurality of continuous read/write requests from the host system. The write parity indicates the time of writing into the parity section. The occupied time indicates the time length of occupation per unit time, and therefore, the utilization rate for each logical volume or the utilization rate for each logical volume or I/O type can be easily acquired. The logical area use information 176 is held in time series at regular time intervals. Especially, the logical area use information 176 is important for the time zone including the day, the week, the month, the year or the year cycle during which the utilization rate increases. The use information acquisition unit 175 collects the data on the use of the logical volume, and produces the logical area use information 176.

FIG. 5 is a diagram showing a data structure for the logical storage unit management information 178. The logical storage unit management information 178 is a table for storing the associated parity group, the size (in MB, GB, etc.), the path definition, the mode and the volume performance for each logical volume. The path definition is an identifier of the I/O port through which the logical volume is accessed by the host system. The mode is divided into "on-line", "off-line", "reserve", "on-line reserve", etc. The "on-line" is the mode in which the particular logical volume is used by the host system, the "off-line" the mode in which the logical volume cannot be used due to a fault or the like, the "reserve" is the status reserved, and the "on-line reserve" is the mode for reservation for data transmission from another storage subsystem 170. The "volume performance" is an index of the performance of the particular logical volume or the parity group associated with it.

FIG. 6 is a diagram showing a data structure of the physical area use information 177. The physical area use information 177 is a table for totalizing the occupied time for each parity group or for each I/O type. The occupied time in this case has the same meaning as the occupied time in the logical area use information 176. The physical area use information 177 is held in time series at regular time intervals. Especially, the physical area use information 177 is important for the time zone including the day, the week, the month, the year or the year cycle during which the utilization rate increases. The use information acquisition unit 175 collects the data on the use of the parity group, and produces the physical area use information 177.

FIG. 7 is a diagram showing a data structure of the physical storage unit management information 179. The physical storage unit management information 179 sets the volume performance, the RAID level, the configuration, the sequential volume and the HDD ID for each parity group. The volume performance is the same as the volume performance of the logical storage unit management information 178. The RAID level and the configuration are the RAID level and the configuration of the disk drive of a particular parity group. The sequential volume indicates whether a particular parity group is to be defined or not for sequential access. The HDD ID is an identifier indicating the type of the disk drive thus configured.

FIG. 8 is a diagram showing a data structure of the storage unit performance information 180. The storage unit performance information 180 is a table indicating the performance of each physical drive. The interface transfer rate is the data transfer rate of the interface between the storage control unit 190 and the physical storage units 201. The command overhead is the time required for processing the command received by the physical storage units 201 from the storage control unit 190.

Based on the performance of the physical drive set in the storage unit performance information 180, the performance of each parity group is determined, and the volume performance can be set. In the case where only one logical volume is set on one parity group, the performance of the logical volume is equal to the performance of the parity group. In the case where a plurality of logical volumes are set on one parity group, however, the access competition occurs between the logical volumes so that the utilization rate of the particular parity group is liable to increase. In view of this, a parity group with a high utilization rate is extracted with reference to the physical area use information 177, and the logical volume set on the particular parity group is acquired with reference to the logical storage unit management information 178. Then the logical area use information 176 is accessed, thereby making it possible to acquire the details of the utilization rate of each logical volume set on the particular parity group. The logical volume having a high utilization rate thus acquired makes up a candidate for relocation.

FIG. 9 is a diagram showing a data structure of the volume management information 126-1 included in the volume management information 126 for managing the whole volume assigned to the host computer 130. The volume management information 126-1 is a table for storing the information on the correspondence between the addresses on the host side and the addresses on the storage subsystem side. The addresses on the host side each include a volume number and an in-volume address. The address on storage side is configured of data items including a storage unit number, a port address, a LU number, an in-LU address, a mode and an emulation type. The storage unit number is an identifier of the storage subsystems 170. The port address is the one for the storage subsystems 170 in the I/O network 140. The mode is one of "on-line", "off-line", "reserve" and "on-line reserve". The emulation type concerns the case in which the disk data format visible from the host computer 130 is emulated by the storage subsystems 170.

This table is for converting an address for the storage recognized by the host computer 130 (an address on host side) to an address of the storage supplied by the storage subsystems 170 (an address on storage side). The host-side address is the one designated for the host recognizing a storage unit and accessing specific data in the storage unit, and in the case under consideration, configured of a volume number and an in-volume address. In the case where the host is connected to the storage by a Fibre Channel, for example, the volume number includes WWN and LUN, and the in-volume address is replaced by the one corresponding to the particular volume number. In the case where the host is connected to the storage by iSCSI, on the other hand, the volume number includes the IP address of TCP/IP, the port number of TCP, iSCI name and LUN, and the in-volume address is replaced by the one corresponding to the particular volume number. In the case where the host is a mainframe, the volume number includes the channel ID, the input/output unit number and the device number, and the in-volume address is replaced by the one corresponding to the particular volume number.

The storage-side address is the one supplied to the computer connected to a particular storage subsystem so that the computer may specify and access a storage unit and the data therein. This storage-side address is configured of such items as the storage unit number, the port address, the LU number, the in-LU address, the mode and the emulation type. In the case where the host computer accesses the storage subsystems through a Fibre Channel, for example, the storage unit number and the port address are replaced by WWN, and the LU number by LUN. For iSCSI, the storage unit number and the port address are replaced by the IP address and the TCP port number, and the LU number by the iSCSI name and LUN. For the mainframe, on the other hand, the storage unit number, the port address and the LU number are replaced by the channel ID, the input/output unit number and the device number.

FIG. 10 is a diagram showing a data structure of the volume management information 126-2 included in the volume management information 126 for managing the vacant area of the storage not assigned to the host computer 130. The virtualization device 120 manages as a storage pool the whole storage area set in the volume management information 126-1 and the volume management information 126-2.

FIG. 11 is a diagram showing a data structure of the relocation information 188-1 set in the storage subsystem 170 constituting a relocation source. The logical volume number 904 indicating the relocation source sets the relocation source with the same number. The relocation destination 905 is configured of the relocation destination address and the inside/outside subsystem 906 for determining whether the relocation destination is inside or outside the storage subsystem 170. The relocation destination address includes the port address 907 and the logical volume number 908, and in the case where the relocation destination is located inside the subsystem, the port address 907 is set to −1. The mode 909 indicates the processing mode 910 of the data copy process for relocation or the data size 911 for the finished copy processing. The execution time 912 is the time point when the copy processing is performed for relocation.

Figure 12:
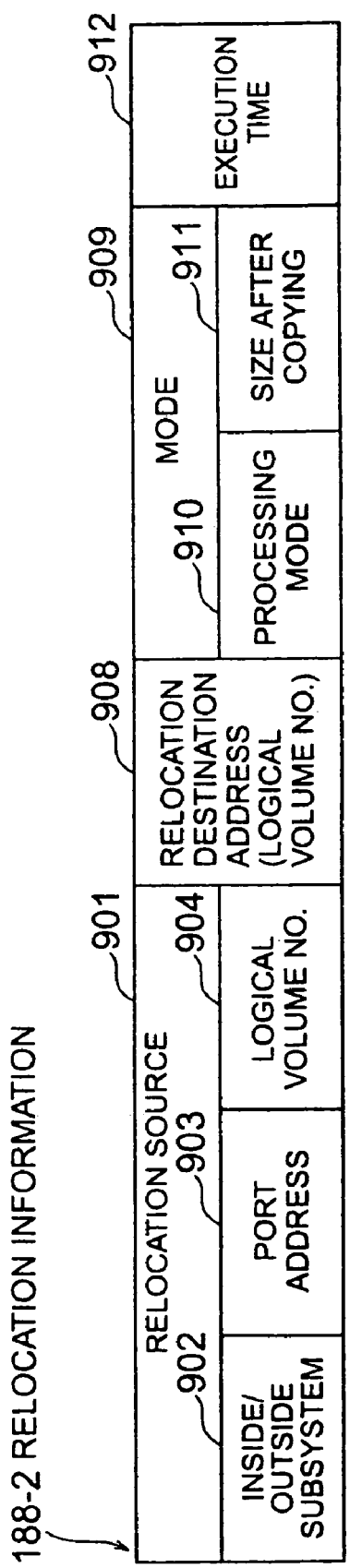
FIG. 12 is a diagram showing a data structure of the relocation information according to an embodiment of the invention.

FIG. 12 is a diagram showing a data structure of the relocation information 188-2 set in a storage subsystem 170 of the relocation destination. The relocation information 188-2 determines the inside/outside subsystem 902 as a relocation source, and sets the port address 903 and the logical volume number 904 of the relocation source 901. The data format is the same as that of the relocation information 188-1. The logical volume number 908 indicating the relocation destination address sets the relocation destination using the logical volume number. The mode 909 and the execution time 912 have the same format as that for the relocation information 188-1.

FIG. 13 is a diagram showing a data structure of the relocation information 188-3 set in the virtualization device 120. The relocation information 188-3 stores the correspondence between the address of the relocation source 901 and the address of the relocation destination 905, the mode 909 and the execution time 912. The relocation source 901 and the relocation destination 905 include the port addresses 903, 907 and the logical volume numbers 904, 908, respectively, and have the same format as the relocation information 188-1. The format of the mode 909 and the execution time 912 is the same as that of the relocation information 188-1.

The relocation determination information 185 stored in the data relocation unit 183 sets the time zone for which it is determined whether the data are to be relocated or not. This time zone, as described above, is any one of the day, the week, the month, the year or the year cycle during which the storage utilization is expected to increase. The relocation execution time information 186 sets the time to start the execution of the copy processing for relocation. This time is the one at which the storage utilization rate is expected to decrease.

Figure 14:
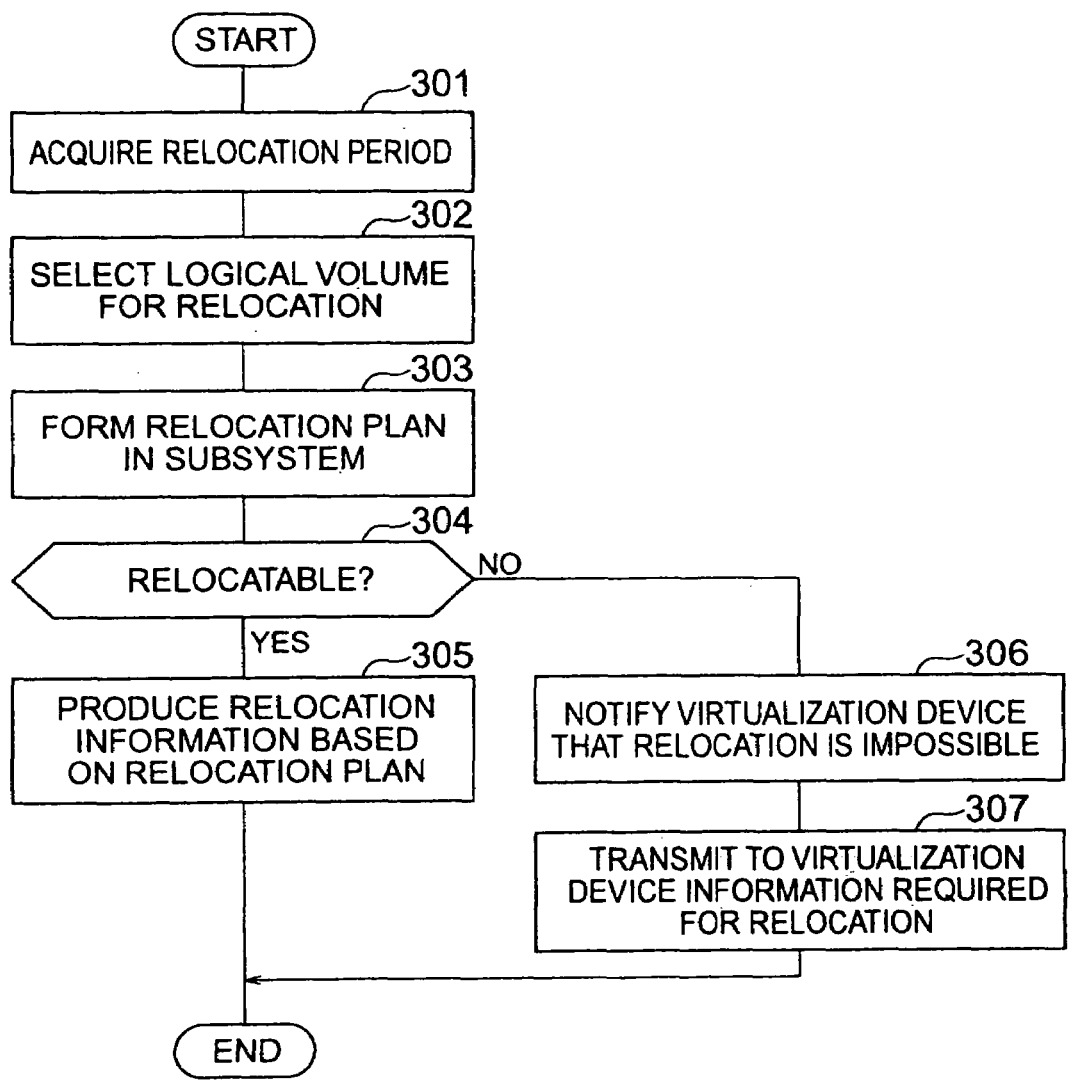
FIG. 14 is a flowchart showing the steps of the process for a relocation information production unit of a relocation source according to an embodiment.

FIG. 14 is a flowchart showing the steps of processing in the relocation information production unit 187. The relocation information production unit 187 acquires the relocation period by accessing the relocation determination information 185 (step 301). Next, the logical volume having a high utilization rate for this intended relocation period is selected as a volume for relocation (step 302). Accessing the physical area use information 177 for the intended relocation period, one parity group with the utilization rate thereof higher than a preset upper limit is extracted. Then, accessing the logical area use information 176 for the intended relocation period, a logical volume with the highest utilization rate set on the extracted parity group is selected as a volume to be relocated. In the absence of a parity group higher than the upper limit of the utilization rate, the process is terminated. Next, the relocation plan in the particular subsystem is formed (step 303). The relocation plan is for moving the data in the selected logical volume to the logical volume not used on another parity group. This movement is carried out on condition that the volume performance of the logical volume of the destination (relocation destination) is not reduced and that the utilization rate of the parity group at the relocation destination is not expected to exceed the upper limit of utilization rate as the result of the particular movement. The volume performance of the logical volume of the relocation destination is determined by accessing the LU/logical/physical-related information 173 and the logical storage unit management information 178. The utilization rate of the parity group of the destination can be predicted based on the intended relocation period and the physical area use information 177 of the destination parity group.

Next, the relocation information production unit 187 determines whether the relocation within the particular subsystem is possible or not (step 304). The relocation is possible in the case where a vacant area (vacant logical volume) having at least the present volume performance of the intended logical volume is available and the upper limit of utilization rate of the parity group of the destination is not expected to be exceeded by the movement. In the case where the relocation is possible, the relocation information is produced based on the relocation plan formed, and registered in the relocation information 188-1 (step 305). The processing mode 910 is set to a processing standby mode (0), and the relocation execution time information 186 is set to the particular execution time 912. In the case where the relocation is impossible, on the other hand, the virtualization device 120 is notified (step 306) and the information required for the relocation is transmitted to the virtualization device 120 (step 307). The required information includes the performance information and the utilization information of the storage units of the relocation source, or specifically, the logical volume number, the corresponding LU number and the in-LU address range, the intended period, the logical volume utilization rate history, the volume performance, the data size, the emulation type, the RAID level and the execution time thereof.

Figure 15:
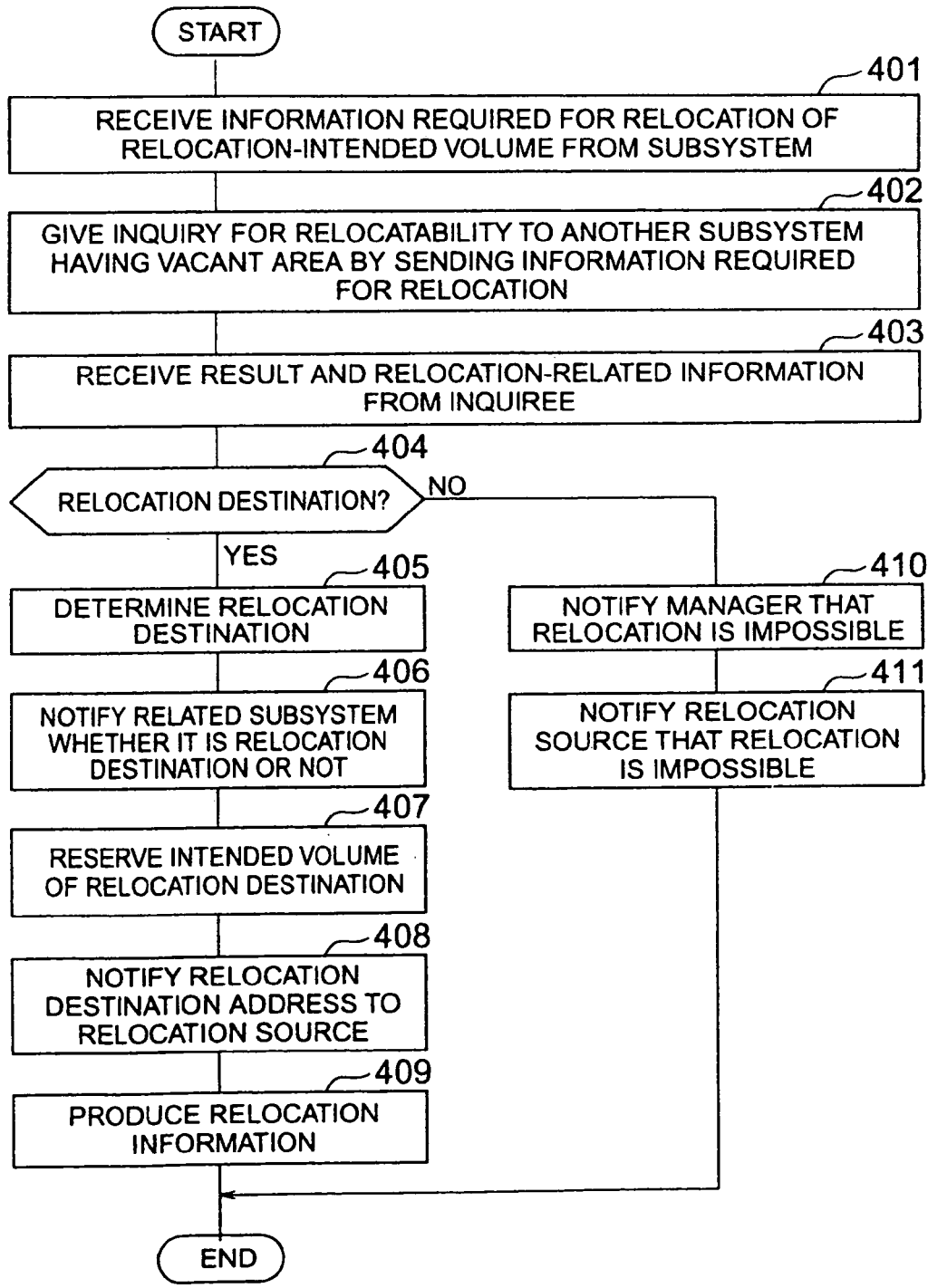
FIG. 15 is a flowchart showing the steps of the process for a manager according to an embodiment.

FIG. 15 is a flowchart showing the process of steps for the manager 122 of the virtualization device 120. The manager 122 receives the notification of the impossibility of relocation and the information required for relocation of the volume to be relocated, from the storage subsystem 170 with data not relocatable within the particular subsystem 170 (step 401). Next, the manager 122, accessing the volume management information 126-2, transmits the information required for relocation to another storage subsystem 170 having a vacant area, and thus makes an inquiry about the possibility of relocation (step 402). Alternatively, the manager 122 may select a logical volume low in an I/O access frequency (low average utilization rate) in place of a vacant logical volume, then transmit the information required for relocation to another storage subsystem 170 having such a volume, and make an inquiry about the possibility of relocation. The inquiry is sent through the network 150 or the I/O network 140.

The manager 122, when searching for another storage subsystem 170 having a vacant area or a logical volume low in average utilization rate by accessing the volume management information 126-2, may consider the simple performance information about the logical volume held by another storage subsystem in addition to the vacant area. The storage virtualization unit 123, for example, holds the average utilization rate and the maximum utilization rate of each logical volume as performance information corresponding to the LU number and the port address in the storage subsystem 170, as well as the volume management information 126. The manager 122 selects as a relocation candidate a storage subsystem 170 having a logical volume low in average utilization rate and maximum utilization rate in addition to a vacant area.

Next, the result as to whether the relocation is possible or not and the relocation-related information from the inquired (step 403). In the case where the relocation is possible, the information required for relocation such as the logical volume number candidate are received, and it is determined from the inquiry result whether there is any relocation destination (step 404). In the case where there exists any relocation destination, one relocation destination is determined from the storage subsystems 170 of one or a plurality of relocation destinations (step 405). Next, the determined relocation destination is notified of the determination of the relocation destination and the address of the relocation source, while at the same time notifying other relocation destination candidates that they will not be relocation destinations (step 406). Then, the logical volume intended for the relocation destination thus determined is reserved (step 407).

The storage subsystem 170 of the relocation source is notified of the possibility of relocation and the address of the relocation destination (step 408). The address of the relocation destination includes a port address and a logical volume number. The relocation information is then produced and registered in the relocation information 188-3 (step 409). The processing mode 910 is set to a processing standby (0), and the execution time determined is set in the execution time 912.

In the absence of a relocation destination, the manager 122 notifies the person in charge of management, through the display unit of the virtualization device 120 or the display unit of the storage management terminal 160, that there has accrued a storage subsystem 170 for which the relocation is impossible (step 410). In other words, the performance problem is posed of the storage subsystem 170 for which the relocation is impossible in the storage pool. Next, the storage subsystems 170 of the relocation source are notified that the relocation is impossible (step 411).

Figure 16:
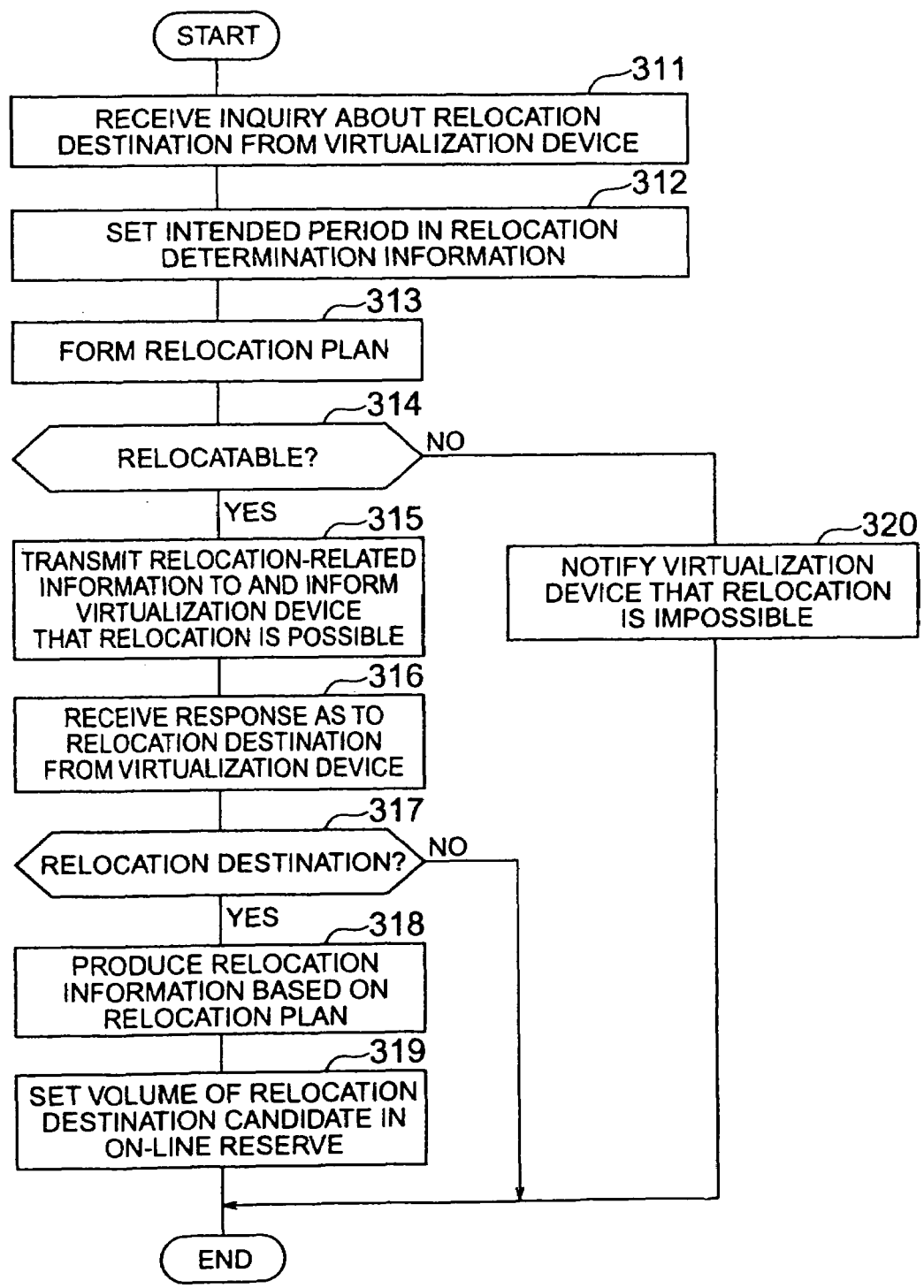
FIG. 16 is a flowchart showing the steps of the process for the relocation information production unit of a candidate for a relocation destination according to an embodiment.

FIG. 16 is a flowchart showing the processing steps for the relocation information production unit 187 in the presence of a candidate for a relocation destination. The relocation information production unit 187 receives an inquiry about the relocation destination and the information required for relocation, from the virtualization device 120 (step 311). The intended relocation period thus received is set in the relocation determination information 185 (step 312). Next, a relocation plan is formed by the same processing as in step 303 (step 313).

Next, it is determined whether the relocation is possible or not according to the same criteria as in step 304 (step 314). In the case where the relocation is possible, the very fact and the information related to the relocation are transmitted to the virtualization device 120 (step 315). A response as to whether the particular storage subsystem 170 is determined as a relocation destination or not is received from the virtualization device 120 (step 316). In the case where the storage subsystem 170 is determined as a relocation destination (YES in step 317), the relocation information is produced based on the relocation plan formed and registered in the relocation information 188-2 (step 318). The processing mode 910 is set to the standby for processing (0), and the execution time received is set in the execution time 912. In the case where the relocation is impossible, on the other hand, the virtualization device 120 is notified that the relocation is impossible (step 320).

Figure 17:
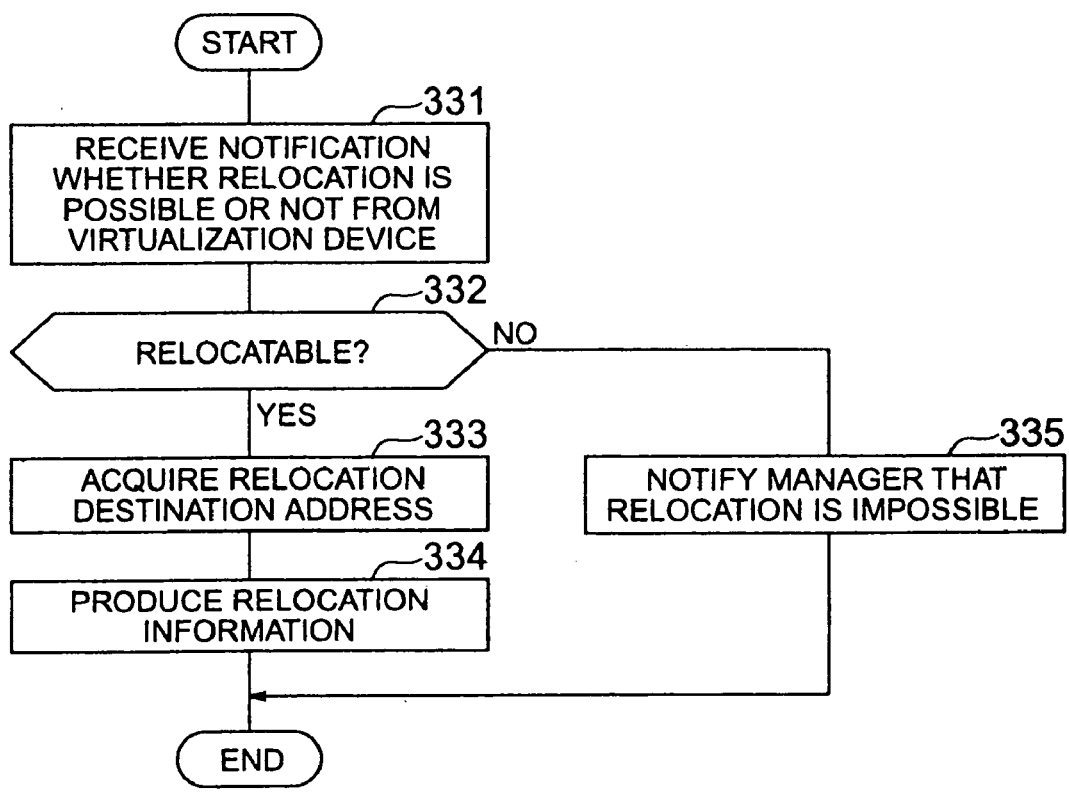
FIG. 17 is a flowchart showing the steps of the process for the relocation information production unit of a relocation source according to an embodiment.

FIG. 17 is a flowchart showing the processing steps for the relocation information production unit 187 of a relocation source. These processing steps follow the process of step 307 shown in FIG. 14. The relocation information production unit 187 is notified by the virtualization device 120 whether the relocation is possible or not (step 331). In the case where the relocation is possible, the notification is accompanied by the relocation destination address and the execution time. From the message thus received, it is determined whether the relocation to another storage subsystem 170 is possible or not (step 332). In the case where such a relocation is possible, the relocation destination address is acquired from the message received (step 333), and the relocation information is produced and registered in the relocation information 188-1 (step 334). The processing mode 910 is set to the standby for processing (0), and the execution time received is set in the execution time 912. In the case where the relocation is impossible, on the other hand, the relocation information production unit 187 notifies the virtualization device 120 or the person in charge of management of the storage management terminal 160 that the relocation is impossible (step 335)

Figure 18:
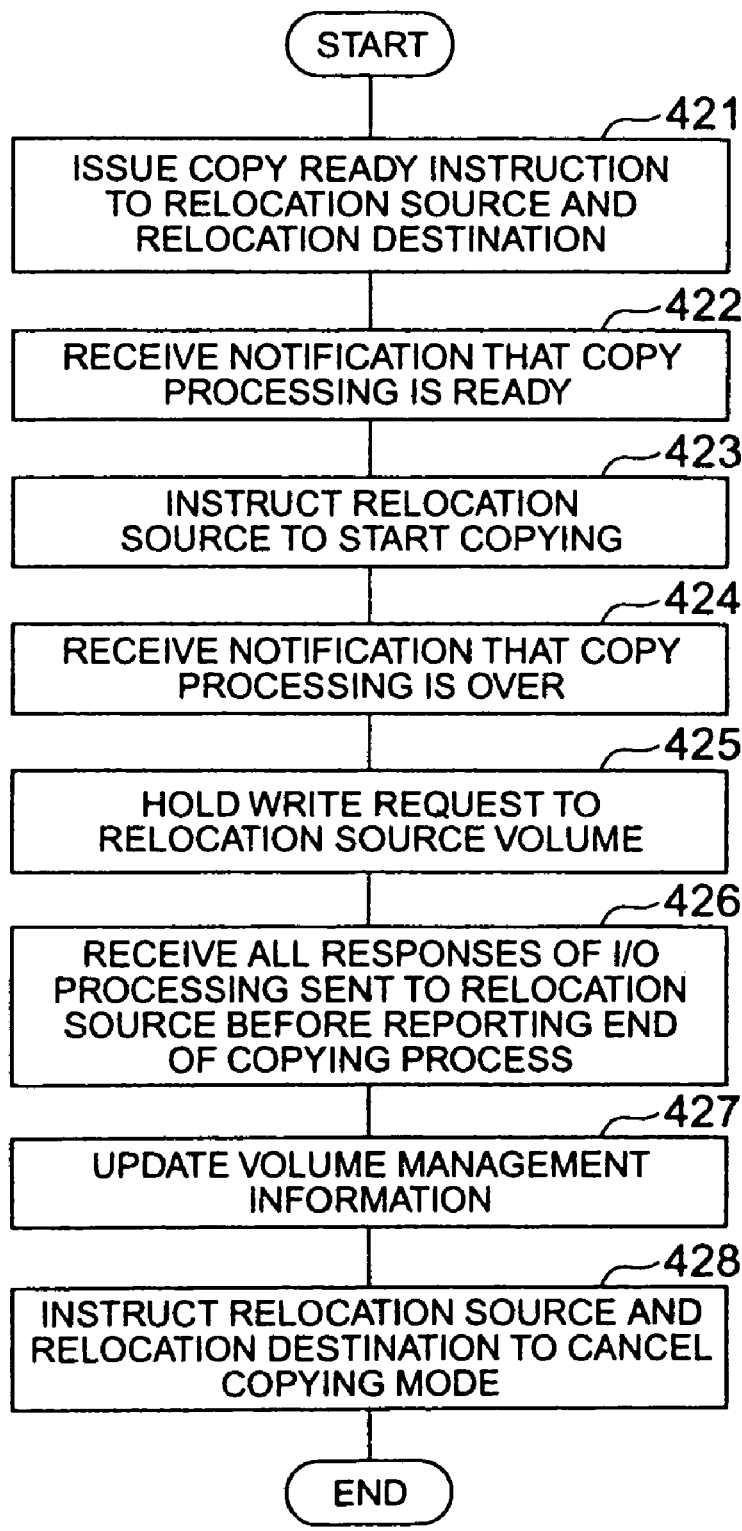
FIG. 18 is a flowchart showing the steps of the process for the manager and the volume management unit according to an embodiment.

FIG. 18 is a flowchart showing the processing steps of the manager 122 and the volume management unit 125 for relocation between the storage subsystems. The manager 122 monitors the execution time 912 of the relocation information 188-3. With the arrival of the set time point, a copy preparation instruction is issued to the relocation source 901 and the relocation destination 905 (step 421). Upon receipt of the notification from both the relocation source 901 and the relocation destination 905 that the copy preparation is over (step 422), a copy start instruction is issued to the storage subsystem 170 of the relocation source (step 423). This start instruction is accompanied by the logical volume number 904 as a relocation source address. In the process, the processing mode 910 of the relocation event of the relocation information 188-3 is changed to the in-process mode. Next, a copy processing end notification is received from the relocation source (step 424). At the same time, the processing mode 910 of the particular relocation event of the relocation information 183-3 is changed to the end mode.

Next, a write request to the relocation source volume received from the host computer 130 is held in the storage unit 127 (step 425). Specifically, the write data due to the write I/O processing request to the relocation source volume received from the host computer 130 is temporarily held on the storage unit 127, while at the same time transmitting as a response the report to the host computer that the write I/O processing request has been met. The updated data due to the write I/O processing request is managed together with the host-side address information. In the case where the write update is carried out for the same address successively, the update data is overwritten each time or the processing sequence information is also managed to hold all the update data with the address and the processing steps. The read request to the relocation source volume may be held or transmitted directly to the storage subsystem 170 of the relocation source. Next, upon receipt of all the responses of the I/O processing transmitted to the relocation source before giving a report to end the copy processing (step 426), the volume management unit 125 updates the volume management information 126-1 and the volume management information 126-2 (step 427). Specifically, with regard to the volume management information 126-1, the LU number and in-LU address range corresponding to the logical volume of the relocation source are changed to the LU number and the in-LU address range, respectively, corresponding to the logical volume of the relocation destination. Also, the volume management information 126-2 is updated in such a manner as to eliminate the LU number and the in-LU address range corresponding to the logical volume of the relocation destination, while at the same time adding the LU number and the in-LU address corresponding to the logical volume of the relocation source.

In the case of selecting a volume low in an I/O access frequency or average utilization rate and copying data to another storage subsystem 170 having such a volume, the storage unit 127 of the virtualization device 120 is used as a temporal buffer for the copying process so that data of the another storage subsystem is not overwritten during the copying operation. For example, the data within the volume of the another storage subsystem 170 is copied or migrated to the storage unit 127, and thereafter the data is copied or migrated from the storage subsystem as the relocation source to the another storage subsystem 170 as the relocation destination. Then, the aforesaid data copied or migrated within the storage unit 127 is migrated to the storage subsystem as the relocation source and also the address information within the virtualization device 120 is changed to thereby perform the volume exchange, whereby the load sharing or distribution is performed.

Next, an instruction to cancel the copy mode is issued to the storage subsystems 170 of the relocation source and the relocation destination (step 428). Based on the volume management information 126-1 thus updated, the write update data held temporarily on the storage unit 127 in step 425 is transmitted to an appropriate storage system 170. In the case where the update data are managed with the processing sequence information and all the update data are held with the address and the processing sequence, the latest update data is selected by accessing the processing sequence information, and transmitted to an appropriate storage system 170.

Figure 19:
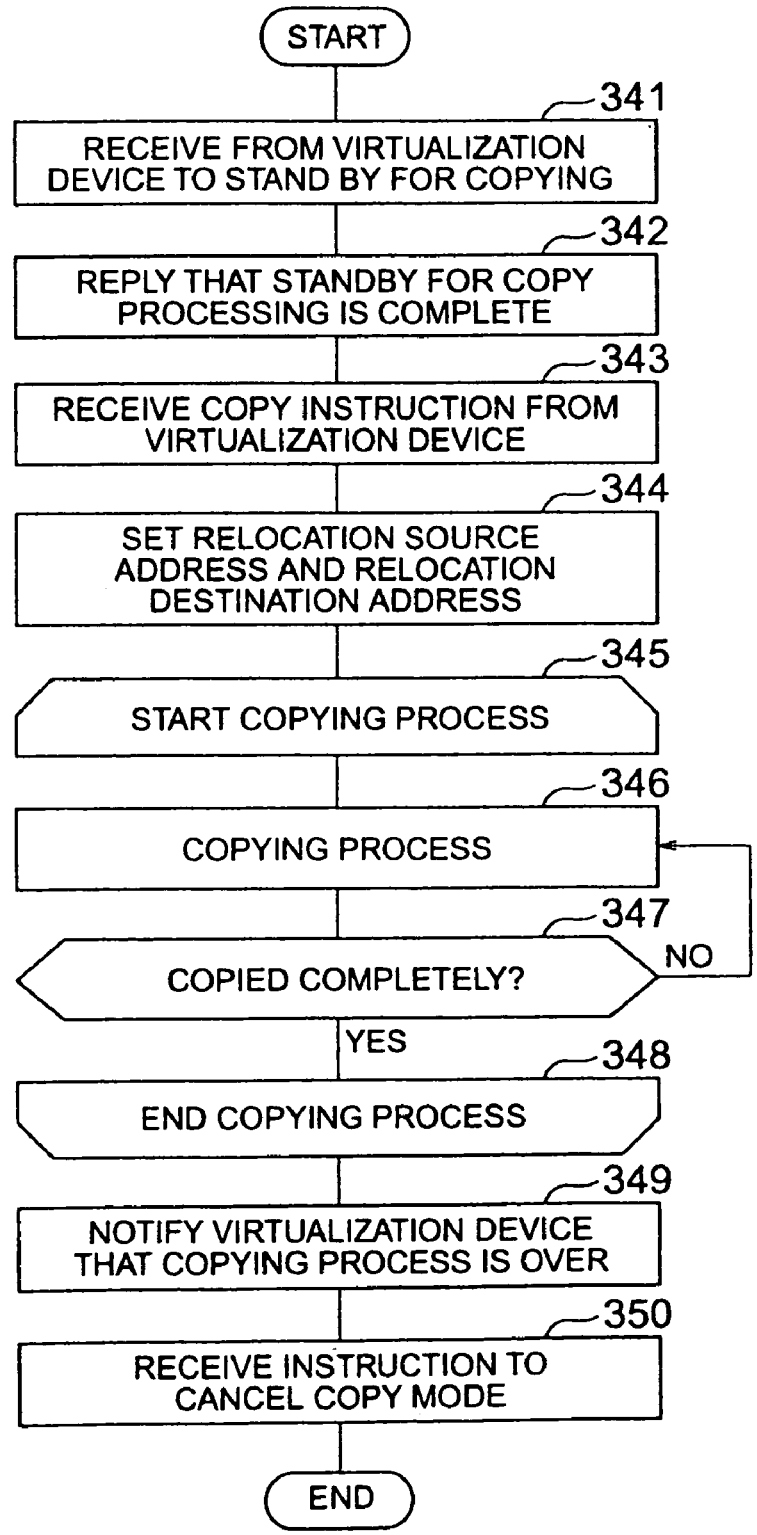
FIG. 19 is a flowchart showing the steps of the process for the copy control unit and the relocation execution unit of a relocation source according to an embodiment.

FIG. 19 is a flowchart showing the processing steps of the relocation control execution unit 184 and the copy control unit 182 of the relocation source. The relocation execution unit 184 receives a copy standby instruction from the virtualization device 120 (step 341). Upon complete preparation for the copy processing, the virtualization device 120 is notified (step 342). Upon receipt of a copy instruction from the virtualization device 120 (step 343), the processing mode 910 of the relocation event of the relocation information 188-1 is changed to the in-process mode. The relocation source address and the relocation destination address are set, and the copy control unit 182 is activated (step 344). The relocation source address includes the head address and the end address of the copy source volume. The relocation destination address, on the other hand, includes the port address 907 and the logical volume number 908 of the relocation destination storage subsystem 170.

The copy control unit 182 starts the copy processing (step 345), and carries out the copy processing by designating the copy destination address sequentially from the data of the head address of the copy source designated (step 346). The control control unit 182 determines whether the copy processing is ended or not (step 347), and if it is not ended, the process returns to step 346 to continue the copy processing. The storage subsystem 170 of the relocation destination receives the data for relocation, and stores it in the logical volume of the logical volume number 908 set in the relocation information 188-2. Upon completion of the copy processing (step 348), the relocation execution unit 184 sets the processing mode 910 of the particular relocation event of the relocation information 188-1 to a standby for processing end, and notifies the end of the copy processing to the virtualization device (step 349). This end notification is accompanied by the logical volume number 904 of the relocation source. Next, an instruction to cancel the copy mode is received from the virtualization device 120 (step 350), thereby ending the processing mode 910 of the relocation event of the relocation information 188-1. In the relocation processing within the storage subsystem 17, the relocation execution unit 184 monitors the execution time 912 of the relocation information 188-1, and with regard to the relocation events that have reached the execution time, activates the copy control unit 182 so that the data is copied from the relocation source 901 to the relocation destination 905 within the storage subsystem 170.

FIG. 20 is a flowchart showing the processing steps for the storage control unit 190 of the copy source including the copying in process. The storage control unit 190, upon receipt of an I/O request from the host computer 130 or the virtualization device 120 (step 361), accesses the relocation information 188-1 and the LU/logical/physical-related information 173, determines whether the I/O request is issued to the logical volume in copying process or not (step 362). In the case where the I/O request is issued to the logical volume in copying process, the requested I/O process is carried out (step 364) as long as a write request is not involved (NO in step 363), and reports the end of the I/O processing to the host computer 120 or the virtualization device 120 that has requested the I/O process (step 365). In the case where the I/O request is not issued to the logical volume in copying process (NO in step 362), on the other hand, the I/O processing in step 364 is executed.

In the case where the I/O request is issued to the volume in copying process with a write request (YES in step 363), it is determined whether the write request is issued to the copy end area or not (step 366). In the case where the write request is not issued to the copy end area, the process proceeds to step 364. In the case where the write request is directed to the copy end area, on the other hand, the update data due to the write request is stored in a corresponding address of the physical storage unit 201 while at the same time copying the update data for the relocation destination (step 367). The relocation destination is notified of the data address such as the block number together with the data. Upon receipt of the notification of the end of the data copying process from the relocation destination (step 368), the I/O process end is reported to the host computer or the virtualization device 120 that has issued the I/O request (step 365).

The software (program) for executing each process in the storage subsystems 180 or the virtualization device 120 shown in FIGS. 14 to 19 can be installed from the storage medium such as a CD-ROM or through the network 150. For example, a recording medium reader not shown is connected to the virtualization device 120, and the software recorded in the recording medium is installed in the virtualization device 120. As another alternative, a recording medium reader not shown is connected to the storage management terminal 160, and the software recorded in the recording medium is installed in the storage subsystem 170 from the storage management terminal 160 through the network 150. In similar fashion, a recording medium reader not shown is connected to the network 150, and the software recorded in the recording medium is installed in the storage subsystem 170 through the network 150.

It will thus be understood from the foregoing description that according to the present invention, a vast amount of information including the utilization history collected within a storage subsystem can be relocated within a storage subsystem or between storage subsystems without being handled by an external means (at a place other than the storage subsystems).

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A storage system comprising:
   a plurality of storage subsystems having a plurality of volumes each including a storage controller and a storage area accessed from a host computer; and
   a manager coupled to the plurality of storage subsystems, the manager being coupled to a port coupled to the host computer,
   said manager migrating data of a portion of the storage area from a source storage area in a source one of the storage subsystems to another storage area in another one of the storage subsystems;
   wherein the manager accesses volume information associated with each of the volumes in the plurality of storage subsystems, and when the host computer accesses data of the storage area of the source storage subsystem, the manager accesses the data in the target storage area based on the volume information.

2. A storage system according to claim 1, wherein:
   said source storage subsystem determines when the relocation of data of a portion of the storage area is necessary and reports the determined necessity from the source storage subsystem to the manager; and
   the manager selects the target storage area, to which data stored in the source storage area is migrated, among storage areas in the other storage subsystems.

3. A storage system according to claim 2, wherein the source storage subsystem determines the necessity of data relocation if there is no candidate volume for the target storage area in the source storage subsystem.

4. A storage system according to claim 2, wherein the source storage subsystem reports usage information of the source storage area to the manager, and the manager selects the target storage area in accordance with the reported usage information.

5. A storage system according to claim 1, wherein the storage area is a logical unit (LU) and the portion is a logical volume.

6. A storage system according to claim 1, wherein the volume information includes information indicating a usage rate of each of the volumes, and the manager selects the target storage area based on the information indicating the usage rate of each of the volumes.

7. A storage system according to claim 1, wherein the volume information includes information indicating a storage subsystem, to which each candidate volume for the target storage area belongs, and
   wherein the manager inquires of each storage subsystem, which has a candidate volume for the target storage area, a capability of the data relocation, receives a response from each storage subsystem, and selects the target storage area based on the response from each storage subsystem.

8. A storage system according to claim 7, wherein each of the plurality of storage subsystems has information indicating usage status of each volume in the storage subsystem, and when each storage subsystem receives an inquiry for the capability of data relocation, the storage subsystem responds to the inquiry based on the information indicating a usage status of each volume.

9. A storage system according to claim 7, wherein each of the plurality of storage subsystems has information indicating a configuration of each volume in the storage subsystem, and when each storage subsystem receives an inquiry for capability of data relocation, the storage subsystem responds to the inquiry based on the information indicating the configuration of each volume.

10. A storage system according to claim 1, wherein the source storage subsystem reports configuration information of the source storage area to the manager, and the manager selects the target storage area in accordance with the reported configuration information.

11. A storage system comprising:

a plurality of storage subsystems having a plurality of volumes each including a storage controller and a storage area accessed from a host computer; and a manager coupled to the plurality of storage subsystems, the manager being coupled to a port coupled to the host computer, said manager migrating data of a portion of the storage area from a source storage area in a source one of the storage subsystems to another storage area in another one of the storage subsystems;

wherein the manager accesses volume information associated with each of the volumes in the plurality of storage subsystems, and when the host computer accesses data of the storage area of the source storage subsystem, the manager accesses the data in the target storage area based on the volume information;

the plurality of storage subsystems includes first volume information having first volume numbers respectively associated with the volumes in the plurality of storage subsystems; and the manager includes second volume information having second volume numbers respectively associated with the first volume numbers in the plurality of storage subsystems.

* * * * *